United States Patent [19]

Stojkov et al.

[11] Patent Number: 4,926,455

[45] Date of Patent: May 15, 1990

[54] SPOT FILMER CASSETTE TRANSPORT VIBRATION SUPPRESSION

[75] Inventors: Mark Stojkov, Parma; Patrick M. Flanagan, Westlake; Victor Hrdlicka, Mayfield Heights; John Geither, Wickliffe; Dennis Everett, Garfield Heights, all of Ohio

[73] Assignee: Picker International, Inc., Cleveland, Ohio

[21] Appl. No.: 339,891

[22] Filed: Apr. 17, 1989

Related U.S. Application Data

[62] Division of Ser. No. 298,339, Jan. 13, 1989.

[51] Int. Cl.$^5$ .............................................. G03B 42/02
[52] U.S. Cl. ..................................... 378/176; 378/167
[58] Field of Search ........................ 378/175, 176, 167

[56] References Cited

U.S. PATENT DOCUMENTS

2,912,588 11/1959 Berggren ............................. 378/176
3,173,011 3/1965 Barrett et al. ........................ 378/176

Primary Examiner—Craig E. Church
Attorney, Agent, or Firm—Watts, Hoffmann, Fisher & Heinke Co.

[57] ABSTRACT

A system and method is disclosed for minimizing residual vibration of a radiographic system due to rapid movement of a radiographic film cassette between a park and expose position. The cassette is moved by a servo system including a servo motor which is responsive to a voltage input waveform to drive the cassette. A waveform is chosen for the voltage input such that no impulse derivatives appear until the waveform has been diferentiated at least three times. The primary natural resonant frequency of the system is determined and noted. The duration of the selected input waveform is adjusted such that the frequency spectrum of the adjusted input waveform defines a relative null which approximately coincides with the primary resonant frequency. The amplitude of the voltage input waveform is then further adjusted as a function of the distance to be traveled by the cassette between the park and expose positions. The servo system can optionally be operated over a portion of the cassette transit in a closed loop fashion. In a mechanical embodiment, sinusoidal cassette acceleration can be effected by the use of a mechanical drive linkage coupled between a motor and the cassette, the drive linkage employing a cycloidal cam and associated cam follower to govern the profile of cassette movement.

4 Claims, 8 Drawing Sheets

A NUMERICAL FOURNIER TRANSFER TECHNIQUE

Fig. 10B

SPOT FILMER CASSETTE TRANSPORT VIBRATION SUPPRESSION

This is a division of application Ser. No. 298,339, filed Jan. 13, 1989.

1. Technical Field

This is a division of application Ser. No. 298,339, filed Jan. 13, 1989.

This invention relates generally to the field of medical diagnostic imaging x-ray systems, and more particularly to a system and method for reducing residual structural vibration in a spot film device caused by film cassette transport motion executed in operation of the device.

2. Background Art

A spot film device is a combination radiographic filmer and fluoroscopic imager. Such devices are commonly mounted for use in conjunction with an x-ray table. The table comprises an elongated top portion on which a patient is placed during an examination, and a generally hollow body portion which supports the top and which can accommodate other components within.

The spot film device includes a housing, sometimes called a "tunnel", which is movably supported on the x-ray table by a movable or column tower. The tower supports the spot film tunnel component for movement longitudinally and laterally with respect to the table top in vertically adjustable planes that are parallel to the table top. An x-ray source is located within the table body and is mechanically coupled to move in unison with the longitudinal and lateral motion of the spot film device. The source propagates x-rays from within the table body, upwardly through the table top and through the body of a patient when positioned on the table top. The pattern of radiation emergent from the upper surface of the patient's body defines an image of the patient's anatomy.

Mounted on the tunnel structure is a fluoroscopic screen facing the source, located in the general portion of the tunnel which is most distant from the front tower supporting the spot filmer. In some installations, an x-ray image amplifier is substituted for the fluoroscopic screen, in which case the x-ray image is converted to a bright visible image that may be viewed directly through an associated optical system in proximity with the amplifier, or by means of a television camera and a remotely positioned monitor.

The rear portion of the tunnel nearest the tower, defines a parking space or position for a radiographic film holding cassette which is used in connection with the radiographic filming function of the spot film device. Transport means is provided for mounting a film cassette for motion between the parking position and an active filming, or "expose", position, more distant from the tower, and being in line with the source and with the fluoro screen or image amplifier. The transport mechanism includes manual, or electromechanical servo, power means, the latter of which, on command, projects the film cassette bearing a portion of radiographic film into the x-ray path expose position to take radiographs of selected images that are detected in the fluoroscopic mode. After each radiograph is taken, the cassette is returned to the park position, and the spot film device continues fluoro mode operation.

The general technology relating to spot filming devices is well known. The following U.S. Pat. Nos., here expressly incorporated by reference, disclose details of typical spot film devices: Stava et al., U.S. Pat. No. 2,767,323; Stava et al., U.S. Pat. No. 2,749,445; Barrett et al., U.S. Pat. No. 3,173,008; and Hunt, U.S. Pat. No. 4,537,538.

The spot film device thus facilitates selected clinical observations made during fluoroscopy to be permanently recorded on film. The speed of cassette transport between these two positions is of great clinical importance, due to involuntary physiological movement within the patient's body, such as peristalsis. It is important that this transport time be as short as possible to permit accurate representation on film without blurring or altogether missing an observation. While striving for minimal transport time, it is nonetheless necessary to also minimize, or avoid altogether, vibration of the structure supporting the spot film device, which vibration is caused by the quick transport of the film cassette between the park and expose positions. This structural vibration, if uncontrolled, can cause blurred images on the film, diminishing their diagnostic usefulness.

Prior methods of cassette transport control include various forms of speed control which attempt to shorten transport time. Other proposals have included force buffering, which attempts to control structural vibration. All prior methods of cassette transport, however, fall short of providing an effective comprehensive solution because none address the complete problem of system dynamics, i.e., the synergistic interaction of the spot filmer and its associated support structure.

One technique for operating a cassette transport servomechanism is to abruptly apply to a servo drive motor of a spot film device a square wave voltage input and to abruptly terminate the square wave input application, such as by way of a limit switch, when the cassette approaches or reaches the end of its predetermined travel path. This technique, however, due to the abruptness of the application and removal of the voltage input, produces significant residual vibration in the structural components of the spot filmer system, such as in the support tower, which is unacceptable for reasons noted above. Therefore, the proposed square wave input method, sometimes called "bang-bang", fails to deal effectively with accommodation of control of the mechanical structural dynamics, either as an integral part of the control strategy or otherwise, to minimize structural motion and improve film image resolution and quality.

It has been proposed, in general industrial servo mechanism technology, to apply mechanical means, such as cams, to mechanical linkages for driving movable components, to reduce vibration attendant upon moving the component from one position to another along a predetermined travel path. Such techniques, however, address only the particular aspect of mechanical control, and do not address the aspect of input command signals to the servomechanism drive motor. Thus, such a purely mechanical approach is not entirely satisfactory in reducing vibration, inasmuch as it does not consider and accommodate the particular attributes of the total system.

In mechanical general industrial embodiments, mechanical means has been provided to impart a generally trapezoidal acceleration profile to motion of a movable component. In such a proposed servo system, the square wave voltage input was applied as described above.

In accordance with another proposal, a spot filmer cassette transport servomechanism was provided wherein the voltage input to the servo motor defines a triangular waveform. According to this proposal, the amplitude of the voltage waveform is modified as a function of the mass of the cassette to be transported, in order to maintain the total transit time for the cassette motion at a constant value, irrespective of the cassette mass. Vibration suppression is believed to have formed no part of this proposal.

In accordance with still another proposal, a servo mechanism was provided for spot filmer cassette transport which includes a number of interchangeable cams, each defining a different acceleration profile for cassette movement. The cam is selected depending upon the mass of the cassette to be transported. This proposal, however, does not address the impact of the input voltage profile on vibration, and thereby does not address the total system needs for reduction of residual vibration.

In the absence of effective cassette transport vibration suppression, designers have sometimes compensated by building such systems with highly rigid support structure, less susceptible to vibration. This measure, however, undesirably increases the weight and cost of systems of this nature.

A known spot film device, a model 1720 A manufactured and sold by Picker International, of Cleveland, Ohio, U.S.A., employs a servo motor to provide film cassette motion. The motor control provides an input voltage to the motor which is a ramp function, in an attempt to reduce residual vibration. As is the case of the other attempts described above, this particular prior art attempt, while helpful to a degree, represents an incomplete solution to the vibration problem. The input voltage profile is not specifically tailored to the mechanical system.

Another prior art spot film device, designated model 1717, manufactured and sold by Picker International, Cleveland, Ohio, U.S.A., utilizes a rotating arm mechanism to provide film cassette motion. Mechanisms such as these, however, are mechanically complex and make optimizing motion forces difficult.

A general object of this invention is to provide a spot film device in which the electrical servo input, servo cassette transport system radiographic system structure, and the cassette itself are all mutually "tuned" to one another to reduce or eliminate residual vibration from cassette transport motion.

DISCLOSURE OF THE INVENTION

The disadvantages of the prior art are reduced or eliminated in accordance with the present invention by the use of a method and system for controlling motion of a movable component of an imaging system employing penetrative radiation. The system includes support structure, and means for defining a travel path for the component between first and second positions along the path. The system further includes servo means responsive to an electrical input signal for driving the component along the path between the two positions.

A method in accordance with the present invention begins with the step of determining the primary resonant natural frequency of the vibratory response characteristic of the total system, taking into account the mass of the movable component, as well as the remainder of the system. This done, the next step is to define, in the time domain, a first function describing a preferred pattern of motion of the component between the first and second positions. This first function is characterized by the absence of an impulsive derivative in any order of derivative less than the second derivative of acceleration of the defined component motion.

Next, one defines the transit time T for the component between the first and second positions, as a second function, this one being a function of the primary resonant natural frequency, such that this second function defines, in the frequency domain, a first relative null substantially coincident with the primary natural resonant frequency. This step of defining the transit time T is performed upon the time domain function derived in the previous step.

Next, the amplitude of the velocity profile, in the time domain, defined by the first function is further adjusted as a function of the distance between the first and second positions along the component travel path. The above definitions being accomplished, an input voltage waveform is applied to the servo system which has substantially the same time domain configuration as the adjusted velocity profile obtained in the previous steps.

This method, and the employment of means for implementing it, substantially reduces, or eliminates altogether, residual vibration in the system which would otherwise result from component motion. The system can be made of elements which are less massive and heavy than are necessary in the prior art, since it no longer necessary for the support structure to suppress vibration, the vibration being eliminated before it begins by the unique design of the voltage input profile in accordance with this invention.

In accordance with a more specific embodiment, this invention is practiced in the context of a radiographic imaging system including a spot filmer having means for transporting a radiographic film cassette between park and expose positions.

In accordance with another specific embodiment, the first function in turn defines an acceleration profile of the movable component which is substantially trapezoidal in shape. This implies that the voltage input to the servo system is substantially triangular in shape.

In accordance with another specific embodiment, the second function, as defined above, between transit time T and the primary natural resonant frequency f, is in the form of:

$$T = a + bf + cf^2 + df^3 + \ldots + nf^m.$$

Other features and aspects of the present invention will become apparent from a study of the following detailed description, and from the drawings, in which:

BEST MODE FOR CARRYING OUT THE INVENTION

Figure 1:
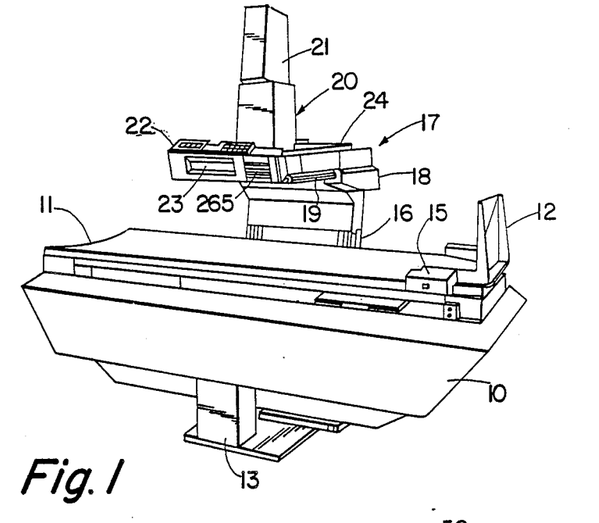
FIG. 1 is a perspective view illustrating a radiographic imaging system incorporating the present invention.

FIG. 1 is a perspective view of a typical diagnostic x-ray system incorporating a spot film device in accordance with the present invention. The system includes an x-ray table having a body 10 within which is located an x-ray source, which is not visible. When energized, the x-ray source projects x-rays upwardly through a table top 11 on which a patient undergoing x-ray examination may be placed.

The table body 10 is supported on a base 13.

The x-ray source is mounted on a known type of carriage which facilitates motion of the source in a direction parallel to the longitudinal direction of the table top.

Extending upwardly from the carriage at the rear of the table top is a tower or column 16 which may be extended and contracted in the vertical direction, and which is movable in unison with the source.

A spot film device 17 is supported on the column 16 by means of a bearing support 18 that cooperates with a pair of tracks, such as one track designated by the reference character 19, to enable the spot film device to be moved manually to a limited extent in a direction transverse to the table top.

Mounted to the top of the spot film device 17 and near its front is a fluoroscopic device which is generally designated by the reference character 20. In modern practice it is customary to use an x-ray image intensifier for fluoroscopy and the use of such a device is assumed in this case. A television camera, not shown, mounted within a housing 21, is used to display the x-ray image, obtained during a fluoroscopic procedure, on a television monitor which is not shown in FIG. 1 but is well known to those of ordinary skill in the art.

A control console for operating the spot film device is located at the front and is designated by the reference character 22. The spot film device has a front opening 23 for inserting and withdrawing a radiographic film cassette at the front of the table. At the top of the device and behind the image intensifier 20 is defined another aperture 24 which provides the option of inserting and withdrawing a film cassette at the rear.

Figure 2:
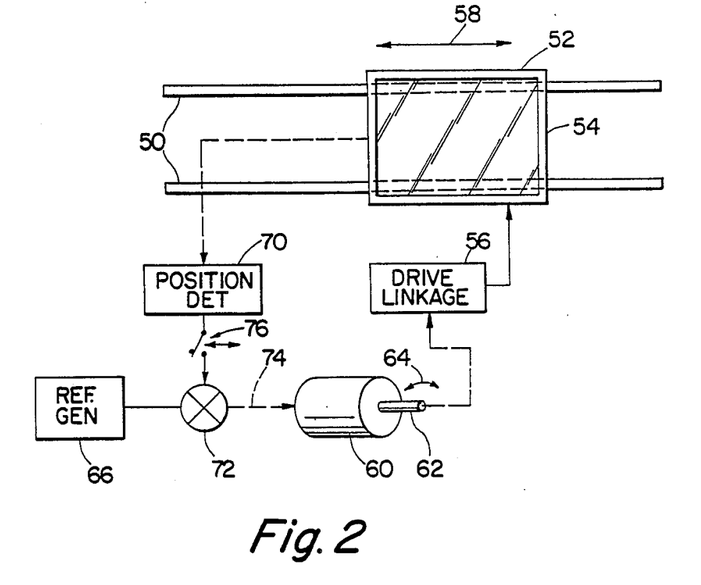
FIG. 2 is a combination plan/block diagram illustrating a portion of the system of FIG. 1.

FIG. 2 illustrates in simplified form apparatus for transporting a radiographic film cassette between the park and expose positions, and drive means for implementing the required movement.

The motion facilitating apparatus comprises, for example, a pair of parallel rails 50 which extend generally from the park to the expose position and are mounted within the housing of the spot film device. A carriage member 52 is mounted for movably riding upon the rails 50, such as by flanged wheels or the like (not shown). Upon the carriage 52 can be positioned a radiographic film cassette 54 of known type. A mechanical drive linkage, shown in block form at 56, is coupled to the carriage 52 in order to drive the carriage along the rails 50 in a direction indicated by the arrows 58 upon the provision of motive power to the drive linkage. That motive power is furnished to the drive linkage by an electric motor 60, comprising an output shaft 62. The motor and drive linkage cooperate such that rotation of the output shaft, in directions indicated by the arrows 64, causes the linear motion of the carriage 52 in the directions indicated by the arrows 58.

A reference generator circuit 66 produces an electrical input voltage signal which is applied to the motor 60. The characteristics of the profile of the input signal produced by the reference generator 66 will be described in more detail below.

Thus far, what has been described is an open loop servo system. Optionally, however, and as described in more detail below, a closed loop servo system can be employed. In such a system a position or velocity detector 70 is coupled to sense position and/or velocity of motion of the carriage 52 bearing its cassette 54. The output from the position detector 70, an electrical signal, is provided to the minus input of an adder circuit 72, which, in such mode of use, becomes an error detector, and produces an error signal along a path indicated at 74 to govern operation of the motor.

Optionally, a switch 76 can be interposed in the signal path between the position detector 70 and the adder circuit 72. When the switch 76 is moved to its left hand position, as shown in FIG. 2, the feedback loop portion of the servo control circuit is broken. When the switch is moved to its right hand position, the closed loop portion of the circuit is operable in conjunction with the forward path loop. By the use of the switch 76, manual or automatic control of disablement and enablement of the feedback loop portion of the servo circuit can be effective. Utilization of such a technique is described in more detail below.

GENERAL CONSIDERATIONS

An important aspect of this invention is to facilitate fast cassette transport without blurring of film images due to structural vibration of the x-ray examination apparatus. This result is achieved by devising a cassette transport system that is governed by unique cassette motion specification, or mathematical relationship, which tunes the power drive to the x-ray apparatus structure in a specific manner. The control function, i.e., the time domain configuration of the input electrical signal applied to the servo, is selected to facilitate fast cassette transport movement with an acceleration profile which is specifically designed to avoid excitation of vibratory response of the underlying support structure, i.e., to avoid as far as possible oscillatory swaying of the film relative to the object being examined and, in addition, to avoid movement of the x-ray beam, causing a blurred image.

Given an apparatus consisting of a spot film device supported by some appropriate structure, operation of the cassette transport system within the spot film device is governed by a mathematical relationship, i.e., a motion specification, between cassette movement travel time T, and the primary resonant natural structural vibration frequency f of the apparatus. The cassette movement time is a function of the mass being transported, that is, the mass of the cassette and that of the other movable parts of the carriage structure.

The input control function, which embodies and implements the motion specification, depends upon the inherent behavior of the frequency domain spectrum of the vibratory response characteristic of the x-ray examination apparatus as a whole, where this response is induced by operation of the cassette transport servo mechanism. The time domain response (the vibratory oscillation or residual vibration) of the apparatus to a disturbance input, such as cassette transport, must be analyzed into its respective frequency components by a Fourier Transformation to specify its associated frequency domain spectrum.

Once this frequency domain interpretation of apparatus behavior is achieved a means arises for determining the most appropriate motion specification, or mathematical expression, for cassette motion. If the motion specification, described by the time domain configuration of servo input, is poorly chosen, the natural resonant frequency response of the apparatus will be stimulated by the input and the resulting vibratory output of the apparatus will exhibit undesirable resonant behavior, yielding detrimental vibration and ultimately a blurred image.

In one embodiment of the present invention, the motion specification is designed such that, when analyzed into its frequency components, can be seen to avoid vibratory stimulation at the resonant response natural to the system, which eliminates residual vibration. Moreover, this input function is further chosen in a manner yielding the fastest possible cassette transport time T consistent with nullifying apparatus resonant response.

In another embodiment of the invention, it is seen that, in principle, the electro-mechanical servo mechanism is operable in an open loop manner, independently of any feed back signals, thus resulting in a much simplified servo mechanism controller. However, this feature does not exclude utilization of classical control theory in the implementation of the invention. In this embodiment, the feedback loop signals are placed subservient to the motion specification here disclosed, during most of the cassette transport motion. In such an embodiment, the techniques of closed loop servo control could function in a passive monitoring mode during the major portion of cassette transport, i.e., in open loop fashion, and only in the terminal phases of motion the closed loop feedback signals are enabled to control the remainder of the cassette transport motion along its defined path.

This invention possesses the added advantage that the apparatus operator does not need to anticipate events and manually command the exposure sequence at an estimated time ahead of the anticipated event, to avoid involuntary physiological movement during exposure, or to capture a designated segment of observation of motion within the patient's body. Because the cassette movement time, in practice of this invention, is quarters of a second) the time delay between command and exposure is quite short. Moreover, even with this short transport time image blurring as described above is avoided.

At this point, it is desirable to set forth in a general way how one goes about specifying, or defining, cassette motion in a way which minimizes residual vibration. As the term implies, "motion specification" involves independently selecting, or determining, a specific time domain pattern of cassette motion. The selection of the pattern of motion is not done arbitrarily, but rather with respect to several important criteria.

Once the pattern of motion is defined, a voltage waveform is developed in accordance therewith and applied as an input drive voltage into the servo system which drives the cassette.

If one defines any time domain function related to cassette motion, such as displacement, velocity or acceleration, an entire set of corresponding profiles are also uniquely defined, each profile corresponding to either displacement with respect to time, or one of its higher order derivatives. For reasons described in more detail below, the inherent qualities of a servo system dictate that the most appropriate motion related profile to which the voltage input should be matched is the velocity profile with respect to time.

Among the parameters of the velocity profile which must be selected, or specified, are (1) the shape of the profile and (2) the width of the profile, expressed in time, which corresponds to the total time T of cassette transport between the park and expose positions. One must also, by known means, determine the primary resonant natural frequency of the vibratory response characteristic of the system as a whole.

The shape of the velocity profile is selected in accordance with the following criterion: The shape must be such that when the function thereby defined is differentiated one or more times, no impulsive derivative occurs below the order of differentiation which corresponds to the second derivative of acceleration of cassette motion. If no impulsive derivative occurs until one reaches even higher levels of differentiation, so much the better. It is believed, however, that a desirable minimum is that no impulsive derivative occurs at an order lower than the second derivative of the cassette acceleration.

One velocity curve which satisfies this criterion is a triangular wave. It does not exhibit an impulsive derivative below the second derivative of acceleration of cassette motion with respect to time. This derivative level corresponds to the fourth derivative of cassette displacement with respect to time.

One can raise the order of differentiation at which impulsive derivatives first occur by modifying somewhat the triangular wave, to generally round its corners.

In terms of mathematics, the reason for avoidance of impulsive derivatives in lower order derivatives of the motion specification function is to cause the frequency domain spectrum of such a function to drop off sharply from a center frequency and to minimize the area under the curve of the frequency spectrum, which has the effect of reducing correspondingly the amount of energy in system vibratory response.

Once the shape of the velocity profile has been selected in accordance with the above criterion, the width of the profile, that is, total transit time T, is then selected or specified. T is specified in accordance with the following criterion: A function is developed relating T to the primary natural resonance frequencies f of the system, such that in the frequency domain, the function defines a first relative null which substantially coincides with the primary resonant natural frequency. In practice, such a function can be calculated using known mathematics to arrive at an equation in the form of:

$$T = a + bf + cf^2 + df^3 + \ldots + nf^m.$$

T, as mentioned above, represents the total transit time of cassette motion. The coefficients a, b, c, d etc. are constant coefficients whose values are selected as a function of the mass of the cassette to be moved.

Once the shape of the input wave form, corresponding to the velocity pulse, has been determined, as well as its width or time duration T, it is then necessary to adjust the amplitude of the actual voltage wave form applied to the servo system. This voltage wave form must be adjusted to an amplitude which is a function of the distance the cassette must travel in time T between its park and expose positions. This amplitude adjustment is also a function of the inherent electrical and mechanical properties of the cassette transport system, such as friction, and the electrical characteristics of the power drive means. Accordingly, adjustment of the amplitude of the input wave form is most advantageously done by simple trial and error, which can easily be done by one of ordinary skill.

DEVELOPMENT OF INPUT CONTROL FUNCTION CONFIGURATION IMPLEMENTING MOTION SPECIFICATION

It is known that, as discussed above, means exist for conveying a film bearing cassette from an x-ray shielded storage or park, position to an exposure position centered in an x-ray beam. The present invention is thus described in the context of a servo controlled spot film device. An embodiment of the invention is implemented by modifying the servomechanism control electronics in a specific manner to generate a control input function which provides the appropriate motion specification for reducing or eliminating residual vibratory response of the system as a whole.

The spot film device, and its attendant support structure, all of which comprise the x-ray examination apparatus, can be represented analytically by a simple mass-spring model. It is well known that the response of a damped spring-mass system initially at rest and excited by a transient arbitrary output is:

$$w(t) = \frac{F'}{ml_n(1-u^2)} e^{ul_nt} \sin 1 - u^2 \, l_n t \quad (1)$$

$$\text{where: } F' = \int_{T_1}^{T_2} F(t)dt \quad (2)$$

with the above terms in equations (1) and (2) defined as:
F = force
t = time
m = mass = natural frequency = damping ratio
e = the exponential function
SIN = the trigonometric sine function From the above relationships it is apparent that the residual vibration displacement w(t) is inversely proportional to mass; therefore, any control method for moving a cassette is dependent upon the mass being transported. This mass is composed of the mass of the particular cassette being used and the mass of the moving parts of the transport mechanism. Here, the mass of the transport mechanism is constant, but that of the cassette is widely variable, at the discretion of the apparatus operator, which variation occurs because of the use of cassettes of different size.

Figure 3:
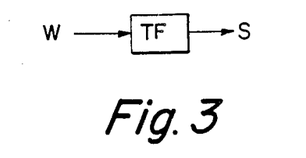
FIGS. 3–5 are block diagrams illustrating a manner of implementing an embodiment of the present invention.

The block diagram of FIG. 3 represents the structure of the x-ray examination apparatus, where 1 (the input) represents the angular velocity of the cassette transport servomechanism drive motor which moves the cassette, and where w (the output) represents the undesired residual vibration displacement. The symbol TF is the transfer function describing system dynamic behavior over time. A purpose of the present invention is to specify 1 in such a way that w is no greater than the level acceptable in the making of high quality diagnostic radiographic images on film, assuming no other disrupting or disturbing influences on the structure.

Figure 4:
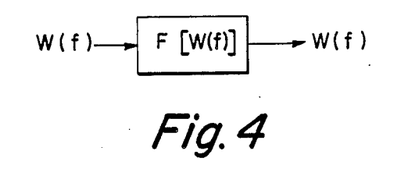

The block diagram of FIG. 4 represents the Fourier Transformation process as applied to the system represented in FIG. 3. 1(t) is the time domain behavior function of motor angular velocity. 1(f) is, in turn, the frequency domain behavior of this same motor angular velocity. F[1(t)] symbolically represents the mathematical process of performing known Fourier Transformation.

Figure 5:
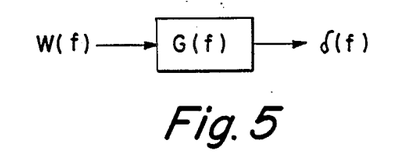

With 1(f) known, FIG. 3 can be translated into the terms illustrated in FIG. 5: that is, 1(f) is as before, w(f) is the frequency domain behavior function of the residual vibration displacement; the term G(f) is the frequency response function which describes system dynamic behavior over frequency.

A purpose of the invention, concurrent and compatible with the purpose as stated above, is to specify 1(f) such that w(f) is controlled in a desired manner.

The principles of motion specification can be applied to properly specify the configuration of the signal w(1) or of its higher derivatives. Guiding insight in doing this, however, must first be gained from inspection of the behavior of the corresponding frequency domain signal.

Figure 6:
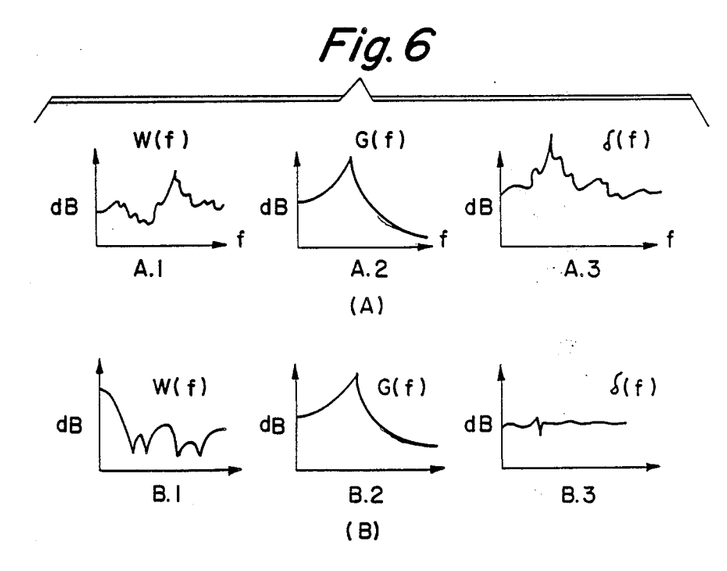
FIG. 6 is a collection of plots of frequency domain graphs illustrating a manner of implementation of the present invention.

In FIG. 6, all plots are frequency domain representations, with the abscissa in terms of frequency (typically expressed in cycles per second, or Hertz) and the ordinates in terms of magnitude (typically in Decibels). FIG. 6(A) represents the case where the principles of motion specification are not used. FIG. 6(B) represents the case where the principles of motion specification are applied with good effect, this being an important aspect of the invention.

Plots 6(A)(1) and 6(B)(1) represent graphically the behavior of 1(f). Plots 6(A)(3) and 6(B)(3) represent graphically the behavior of w(f).

Plots 6(A)(2) and 6(B)(2) represent graphically the behavior of the frequency response function G(f), and are identical. This function is unique to each x-ray examination apparatus and it describes the resonant natural response of the apparatus. This function need not be known in detail to successfully implement the present invention.

The derivation of the vibratory response characteristics of mechanical systems is discussed in detail in the following publication, which is hereby expressly incorporated by reference: Halvorsen, W. G., "Impulse Technique for Structural Frequency Response Testing", Sound and Vibration, November, 1977, pp. 8–21 by PCB Piezotronics Inc., Buffalo, N.Y.

The general principles of transymmeteric motion specification are discussed in the following publication, which is hereby expressly incorporated by reference: Kramer, S. N., "Development Of The Variable rate Transymmetric Motion With Discretely Vanishing Shock", Journal of Mechanism, Transmissions, and Automation in Design.

Reduction of residual vibration is discussed in the following publication, expressly incorporated by reference: Meckl, P. H., et al., "Minimizing Residual Vibration For Point-To-Point Motion", Transactions of the ASME, Journal of Vibration, Acoustics, Stress and Reliability in Design 85-DEP-17, pp. 1–5.

If, as in the case of FIG. 6(A), no motion specification is applied to the input to the system, then some energy associated with the input will contribute to exciting the resonant response of the apparatus and objectionable residual vibration displacements, w(t), will result. This situation is avoided in FIG. 6(B), by applying a suitable motion specification to the input.

While the plots of FIG. 6 are not intended as precise, but rather of a qualitative informational nature, the difference between the cases FIGS. 6(A) and 6(B) can be easily discerned.

It is first noted in plots 6(A)(2) and 6(B)(2) that the function G(f) exhibits a primary natural resonant frequency easily identifiable by the peak in each curve. Note further that the function 1(f) exhibits a peak at a frequency near the resonant frequency described in connection with G(f). The result, shown in FIG. 6(A)(3), is that the frequency plot of actual vibratory motion shows a high spike in the neighborhood of the primary natural resonant frequency which indicates that a large amount of energy is vibrating the structure of the radiographic spot film device, probably blurring the image.

Referring, by contrast, to FIG. 6(B)(1), it will be seen that, by application of proper motion specification defining the function 1(f), residual vibration can be minimized. Note that the function 1(f) in FIG. 6(B) contains a minimum of energy at a frequency in the neighborhood of the primary natural resonant frequency of the system as defined by the function G(f). As a result, the actual vibratory motion of the system, plotted in FIG. 6(B)(3), shows only a minor disturbance in the neighborhood of the primary natural resonant frequency of the system.

Figure 7:
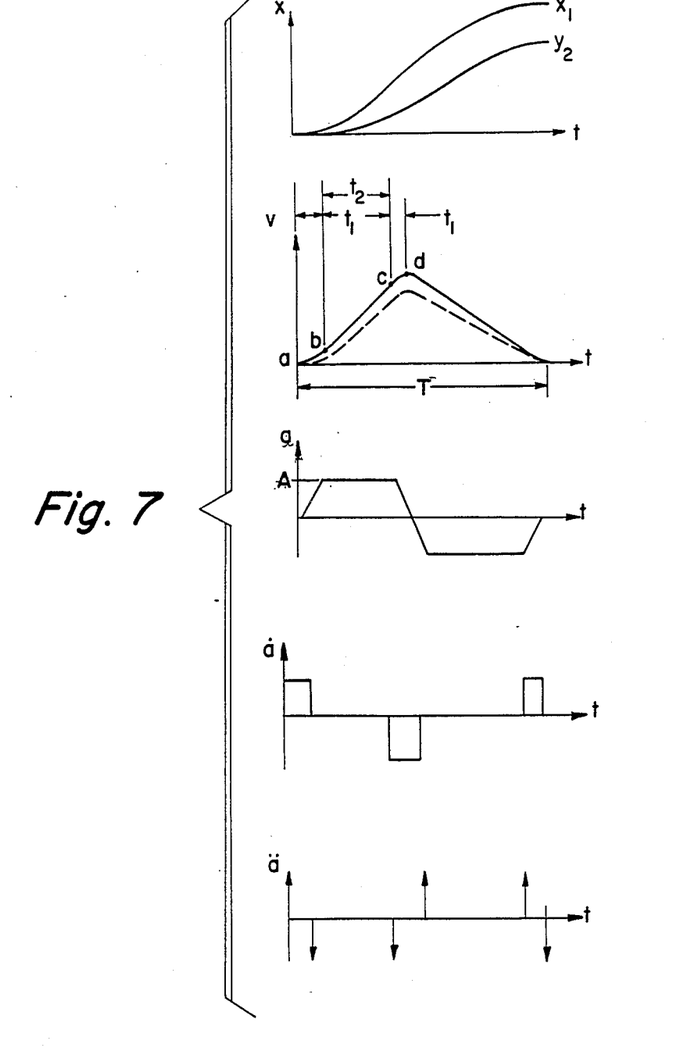
FIGS. 7 and 8 are time domain plots illustrating a manner of implementation of the present invention.

The diagrams of FIG. 7 depict a method of the specification of the cassette motion to minimize residual vibration of the system which results from such motion. In each case, the abscissa is time and the ordinates are, respectively from bottom to top: second derivative of acceleration (a)··; first derivative of acceleration (a)· acceleration (a), velocity (v), and displacement (x), all pertaining to the linear motion of the transported mass.

By suitably shaping (i.e., specifying) any one of these profiles, vibratory displacement w(t) can be altered and controlled. In practice, it is convenient and expeditious to apply the motion specification to the velocity (v) profile. This is true because the typical configuration of the servo electronics is voltage-mode; that is, voltage is the controlled variable and variation of voltage is directly proportional to variation of steady state motor angular velocity (1), which is in turn directly proportional to the linear velocity (v) of the transported mass, by virtue of a linking mechanism between the motor output shaft and the cassette.

For best effect, however, it is preferable to first shape the acceleration (a) profile and accept the velocity (v) profile that is dictated by the acceleration time domain function, and only then implement the hardware for executing this particular velocity profile which results. The method for profile determination is further discussed below.

As shown in FIG. 7, an acceleration function is chosen which, in the time domain, is substantially trapezoidal in shape.

The velocity (v) profile resultant from this choice of acceleration profile and illustrated in FIG. 7 results from mathematical integration of the trapezoidal acceleration (a) profile and is here termed the "transymmetric velocity pulse". Segments a-b, b-c, and c-d are described mathematically as:

$$\text{Segment } a - b: v = \left(\frac{1}{2t_1} A\right) t^2 \quad (4)$$

$$\text{Segment } b - c: v = A\left(t - \frac{1}{2} t_1\right) \text{ Eq.'s}$$

$$\text{Segment } c - d: v = A\left(2 + \frac{1}{t_1} t_2\right) t - \frac{1}{2t_1} A t^2 -$$

$$A\left(t_1 + t_2 + \frac{1}{2t_1} t_2\right)$$

As will be discussed, the choice of a trapezoidal acceleration function for cassette movement is a good one for reducing residual vibration. The discussion relating to FIG. 8, and the different acceleration profile shown there, along with the plots of FIG. 9, will assist in the understanding the reasons for the superiority of the FIG. 7 acceleration profile.

Figure 8:
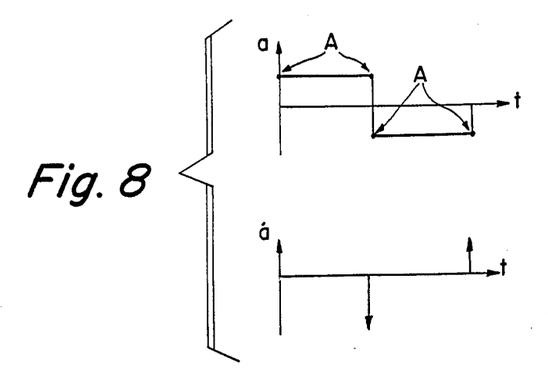

In FIG. 8, it is seen that, for a square acceleration profile, the square corners result in an impulsive derivative, (i.e., an undefined spike) in the immediate next higher derivative (a)· The impulse, in this figure is represented symbolically by arrows.

Figure 9:
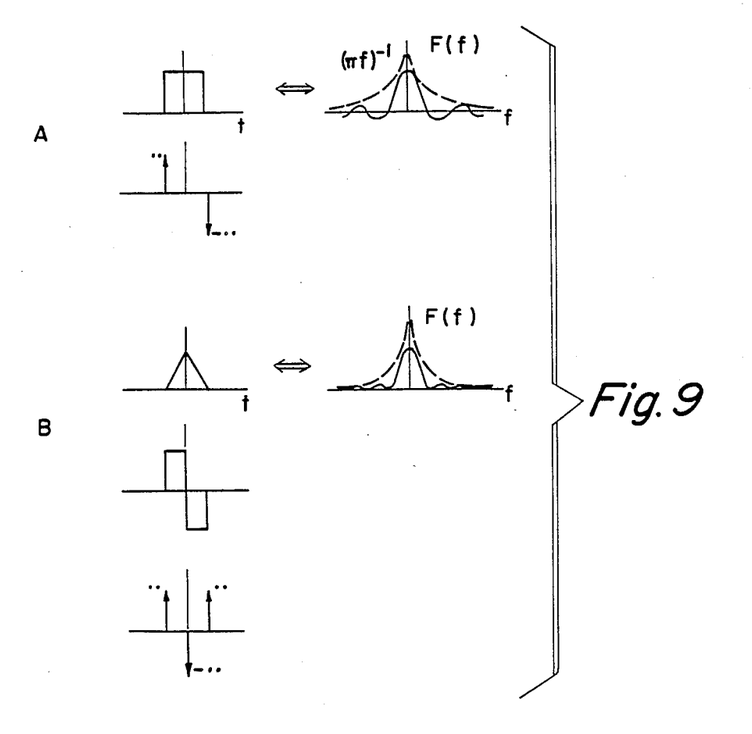
FIGS. 9 and 10 are further graphical representations of the manner of implementing the present.

The diagrams of FIG. 9 depict the effect of the impulse on frequency domain distribution of the profile. In FIG. 9(A) it is seen that the square profile exhibits impulsive behavior in the next higher derivative, and that the frequency spectrum of this profile, as determined by Fourier analysis, diminishes from its center frequency as the inverse power of one.

Referring again to FIG. 7, an alternate shape of profile, a triangle, is used. This profile exhibits impulsive behavior, not in the next higher derivative (a)· but only in the second higher derivative (a)·· It is thus seen that this triangular profile has a frequency distribution spectrum which diminishes from its center frequency much faster than that of FIG. 9(a), i.e., as the inverse of the power of two.

The frequency spectrum behavior illustrated in FIG. 9(b) is a distinct improvement over that illustrated in FIG. 9(a), because it is known, from Rayleigh's Theorem, that the integral of the frequency domain spectrum describing behavior of a mechanical system is related to the magnitude of energy of vibration of the system in the time domain. Accordingly, sharp diminution of the magnitude of the frequencies with respect to distance from the center frequency suppresses the magnitude of the energy of the system vibration.

It is thus apparent that the trapezoidal acceleration profile of FIG. 7 is far superior to a lesser form such as the square acceleration profile of FIG. 8 by virtue of where the impulsive derivatives occur. In the trapezoidal acceleration profile, the impulsive derivative occurs in a higher order than in the case of the square wave. This results in reduced energy distribution with frequency, and a frequency spectrum highly concentrated about the origin frequency of zero Hertz.

Figure 10:
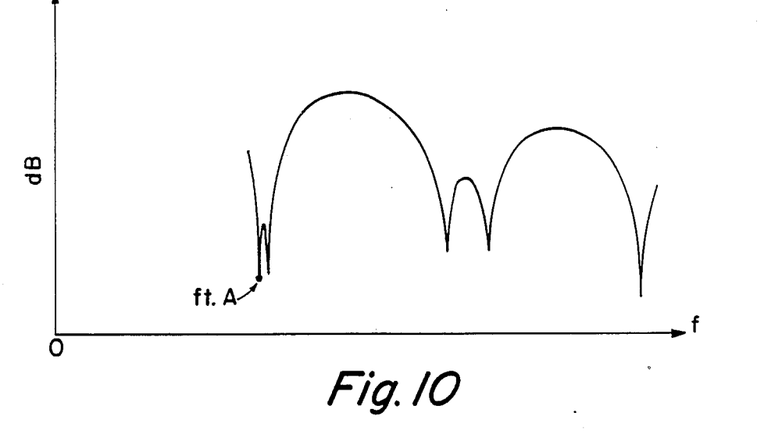

A representative frequency distribution spectrum (obtained by Fourier techniques) for this transymmetric profile is depicted in FIG. 10. A further aspect of this invention is to now, having selected a velocity profile shape such that the function does not become undefined before being differentiated at least more than twice, formulate the time duration of the transymmetric velocity pulse of FIG. 7 in such a manner as to cause the frequency of the first relative null, or minimum, of its frequency spectrum, labeled "a" in FIG. 10, to coincide with the primary resonant natural frequency f of G(f) in FIG. 6. If this is done, the attenuated frequency distribution behavior depicted in the plot if FIG. 6(B)(3) is achieved.

To achieve this goal it is important that a particular functional relationship between the transymmetric velocity pulse duration T and frequency f, be utilized. For example, given one particular transymmetric profile from among numerous variations, the functional form defining the duration of the transit time T, for movement of a component of a given mass, is:

$$T = 824.32 - 129.29f + 90.4010f^2 - .2659f^3 - \quad (3)$$
$$.00288f^4 + .000307f^5 - .0000045f^6$$

A family of functions of this form exists, for each given imaging system, one equation for each discrete cassette mass which is to be transported. Once established for a selection of different masses to be used, these discrete equations relating T, or transit time, as a function of frequency f, are susceptible of storage in an appropriate means, such as a section of known memory hardware dedicated to operation of the servo-mechanism of the radiographic system.

The coefficients of the T vs. f equations are functions, not directly, but only indirectly, of cassette mass. More specifically these coefficients are functions of the total vibratory response characteristic of the entire system. The total vibratory response of the system is, however, itself in turn a function of cassette mass.

Stated another way, G(f) is a function of the dynamic response of the whole system, which in turn is a function of cassette mass.

Known techniques of experimental modal analysis can be used to determine characteristics of the mechanical dynamic response of a system, and can be repeated for each cassette intended for use.

Using such techniques, the primary resonant frequency of a given system, using a given cassette mass, is determined, and noted. Then, the chosen shape of the velocity pulse is analyzed mathematically, as described below, by means including Fourier techniques, to determine just what duration of the chosen shape of pulse will yield a pulse having a frequency spectrum whose first relative null coincides with the previously determined primary resonant frequency of the system in question, using the given cassette mass.

The Fourier analysis described in more detail below yields an equation T vs powers of f having a unique set of coefficients a, b, c, d, etc.

A method of producing such a family of equations is discussed in the following, here expressly incorporated by reference: Stojkov, M., "Reduction of Residual Vibration of Robot Structures by Computer Control" (Thesis at Cleveland State University, Cleveland, Ohio, U.S.A.).

The following is a general discussion on how the family of equations are obtained:

For reduced residual vibration performance it is desirable to have the resonant frequency coincide with a frequency null of the drive function spectrum, eliminating excitation energy. The square wave spectrum, for instance, exhibits the familiar humped behavior of the sine function, also variously known as the filtering or interpolating function; this function offers numerous possible nulls. To choose the proper one a relation between pulse duration and frequency is needed.

The closed-form analytic Fourier transform of the square pulse, (Hsu, H. P., "Fourier Analysis," rev. ed., Simon & Schuster, New York, 1970, p. 78, incorporated by reference) with f(t) as unity over the integration interval is:

$$F(f) = \int_{-X}^{X} e^{-j2\pi ft} dt$$

Integration yields:

$$F(f) = T \frac{\sin(! \, tf)}{(! \, tf)} \quad (5)$$

The relationship between pulse duration in the time domain and frequency of the first spectral null derives from Eqn. (5). The function F(f)=0 when the argument of the sine term equals n x Pi; n=1 for the first null, giving:

$$T = 1/f \quad (6)$$

From this expression it is apparent that for a specific resonant frequency a specific pulse duration (i.e., repositioning transit time) is required. For extremely low resonant frequency structure relatively long (slow) pulses are necessary; higher resonant frequency structures tolerate faster pulses.

Figure 10A:
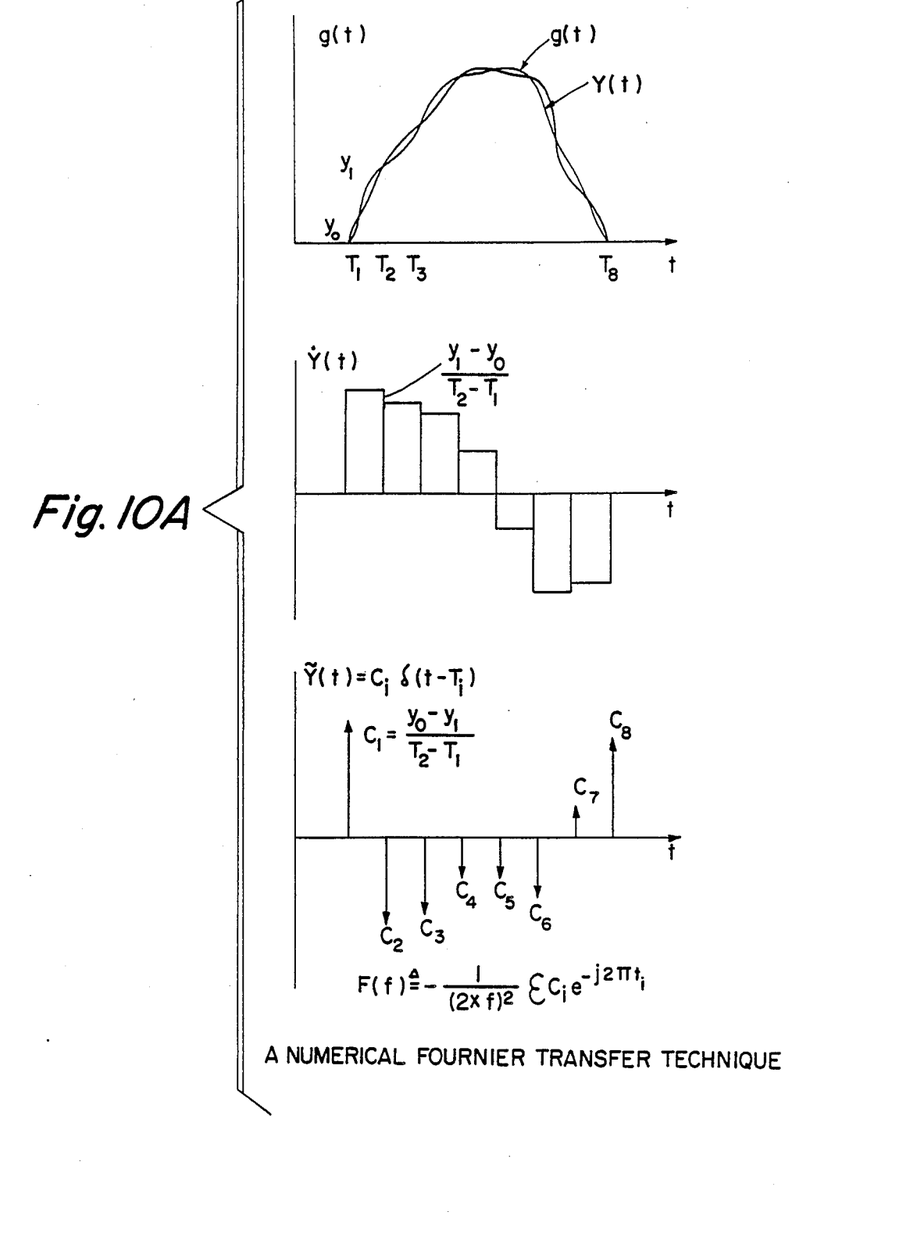
FIGS. 10A and 10B are graphical representations of responses employed in implementing the present invention.

A relation analogous to Eqn. (6) is now needed for the transymmetric pulse. The analytic Fourier transform of the transymmetric pulse is not readily available closed-form but can be approximated by a polynomial curve fit method making use of the Derivative Theorem as shown in Papoulis, A., "The Fourier Integral And Its Applications," McGraw-Hill, New York, 1962, P. 53, incorporated by reference. The function being transformed is approximated, in the simplest form, by linear segments. This procedure is represented in FIG. 10A. Differentiating this polygon approximation function twice yields a series of impulse functions:

$$f''(t) = \& \, C_i \, w(t - T_i)$$

The Fourier transform of this shifted impulse function is:

$$F(f) = \int_{-T/2}^{T/2} f''(t) \, e^{-j2\pi ft} dt$$

The following transform pairs apply in the above integral (see [61]):

$$w(t - T_i) \#\$ e^{-j2\pi fT_i}$$

$$\frac{d^n f}{dt^n} \#\$ (j2 \, ! \, f)^n F(2 \, ! \, f)$$

giving the following results:

$$F(f) = \frac{1}{(2 \, ! \, f)^2} \& \, C_i \, e^{-j2\pi fT_i} \quad (7)$$

Figure 10B:
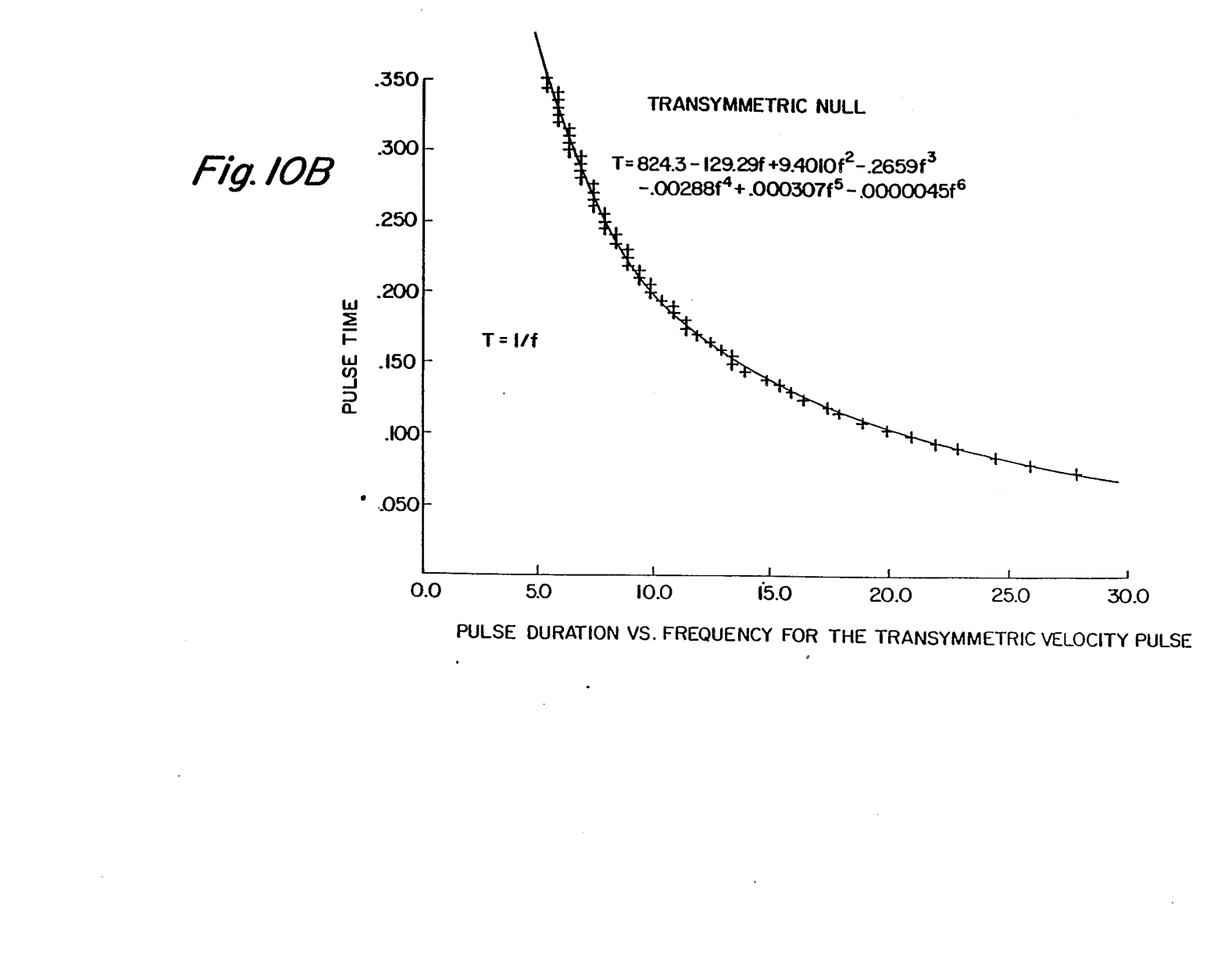

A computer program can be developed to perform this Fourier transform, if desired, or the calculations can be done manually by one of ordinary skill. The frequency and time data from it can then be curve-fit by polynomial regression to give a more manageable expression. FIG. 10B presents the results.

Comparison of the computer spectra of the square and transymmetric pulses is instructive. For the square pulse an important feature to note is that the steep flanks of the notches leading to the nulls indicate a sensitivity to frequency variation. Depending upon the structure, this characteristic may be detrimental. With the transymmetric pulse an increase in bandwidth about the null is realized, as well as a small decrease in frequency sensitivity. These aspects are apparent in the form of the peculiar shape of the spectrum. An additional hump has begun forcing its way into the notch, widening it and thus decreasing sensitivity to frequency variation over a limited bandwidth. Admittedly, the spectrum magnitude behavior in this widened frequency zone is not flat, but nonetheless the magnitude of the energy content is limited.

Adjusting a system's performance to take advantage of these spectral nulls requires adjustment of the repositioning move pulse duration. If for a given pulse duration the structure resonant frequency of interest falls to the left of the first null in the spectrum, then the duration must be increased to shift the null to lower frequencies. This inverse behavior follows directly from Eqn. (6). It is emphasized that the optimum transit time is directly governed by the lowest resonant frequency of the structure.

Referring again to FIG. 7, the plots of velocity (v) and displacement (x) result from the transymmetric acceleration specification being a trapezoidal function, and they are descriptive of transport of some particular mass over specific distance $X_1$. To move this mass some lesser distance, for example, $X_2$, while keeping the same transit time duration T, the transymmetric velocity (v) pulse is reduced correspondingly in amplitude.

Figure 11:
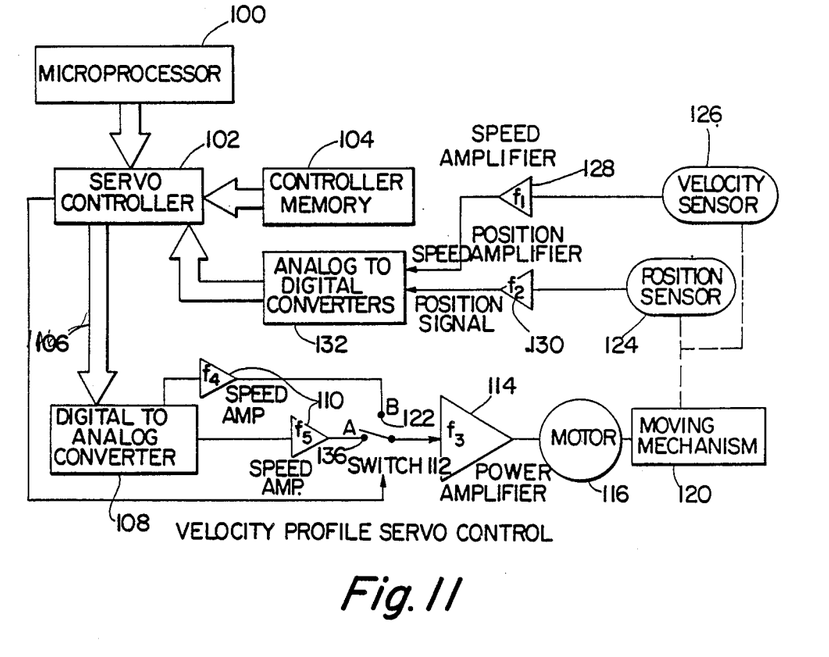
FIG. 11 is a block diagram illustrating an example of a servo control system for use in connection with the present invention.

FIG. 11 illustrates a practical embodiment of the servo system according to the present invention. It is to be understood, however, that the present invention is not limited to the specific implementations illustrated in FIG. 11.

A microprocessor 100 controls the operations of the spot film device. A portion of the capacity of the microprocessor is dedicated to high level control of the electro-mechanical servo mechanism.

Representations of the family of equations (3) in the form as described above are stored in the microprocessor for use in operating the cassette transport system for each different cassette selected. As the mass to be transported changes due to selection of different sized cassettes, the microprocessor determines the required transit time T, by applying the one of the family of equations in the form such as (3) which is derived for the particular cassette mass selected.

A digital electronics servo controller 102, of known design, accommodates both position and velocity feedback.

Computer capacity is provided by a dedicated controller memory 104 associated with the servo controller. It is in the memory 104 that the transymmetric velocity profile data of equations (4) reside. The servo controller 102 consults the controller memory containing data representing the shape of the desired velocity profile and either acquires or calculates the velocity profile data with the transit time T, as selected by the microprocessor.

The servo controller then outputs the velocity profile as an electrical voltage time varying drive signal 106.

The drive signal is converted by a digital to analog converter 108, and fed to a speed amplifier 110. From the amplifier 110 the signal is transmitted through a switch 112 to a power amplifier 114 providing power to a motor 116. The power amplifier amplifies the velocity profile signal and drives the servo motor accordingly. In this manner the mass to be transported is made to travel to the expose position from the park position with a unique and particular triangular velocity profile which minimizes structural vibration. The mass to be moved is represented by the box designated 120.

When switch 112 is in its upper position, contacting terminal 122, the motion of the mass being transported is controlled in an "open loop" manner.

A position sensor 124 and a velocity sensor 126 are also provided. During transport the position and velocity sensors return respectively feedback signals through amplifiers 128 and 130. Signals from the amplifiers 128, 130 are directed through analog to digital converters 132, which return the digital information to the servo controller 102, which monitors these signals.

During the terminal phase of cassette transport, i.e., the last two or three percent of the transport distance as determined by the position feedback signal, the servo controller actuates the switch 112 to move to its downward position to contact the terminal 136. The control system operates in the closed loop fashion for the last two or three percent of cassette travel as the position and/or velocity feedback signals assume control authority in known fashion as the transported mass comes to rest at the expose position at the end of its travel.

Another feasible embodiment involves continuous closed loop operation. In this mode of operation the switch 112 is permanently set to engage the terminal 136, or the switch 112 is omitted altogether. The position and velocity feedback signals pass through appropriate amplifiers and are then transformed by the analog to digital converters. These digital position and velocity signals are transmitted to the servo controller 102 which generates a digital error signal. In this case the velocity error signal is the primary control signal. The position error signal is redundant but it may be used as a second control parameter to gain a higher degree of control over the system. It is understood that the controller memory 104 provides the appropriate velocity profile to serve as the reference signal in closed loop operation. The servo controller digitally combines the velocity feedback signal with the reference signal to create the error signal in accordance with known feedback control technique. The velocity error signal is digital to analog converted and sent sequentially to amplification circuitry. Thus, the motor 116 is driven such that its rotational velocity profile corresponds to the reference profile, within the limits of prescribed error bounds.

By operating in an open loop manner, when this mode is chosen, the motion specification technique strives to beneficially control, at the outset of motion, the input energy and vibration of the system, and to avoid undesired system vibratory response a priori.

This open loop operating characteristic, and the ability of embodiments of the present invention to prevent undesirable vibratory response from occurring in the first place, illustrates an important aspect of this invention and an important advantage over the prior art. In the prior art closed loop servo and other methods, such as motor reversal, various types of shock absorbers, etc., are employed to mitigate, after the fact, the undesired vibratory response of this same input energy. Thus, it could be said that the prior art devices are curative in nature, while the embodiments of the present invention are preventive.

In accordance with another embodiment of the invention, a mechanical linkage including a cam is interposed between the servo drive motor and the movable cassette in order to impart motion to the cassette. The mechanical linkage defines, in the time domain, a sinusoidal acceleration function over the path of cassette movement between the park and expose positions.

Figure 12:
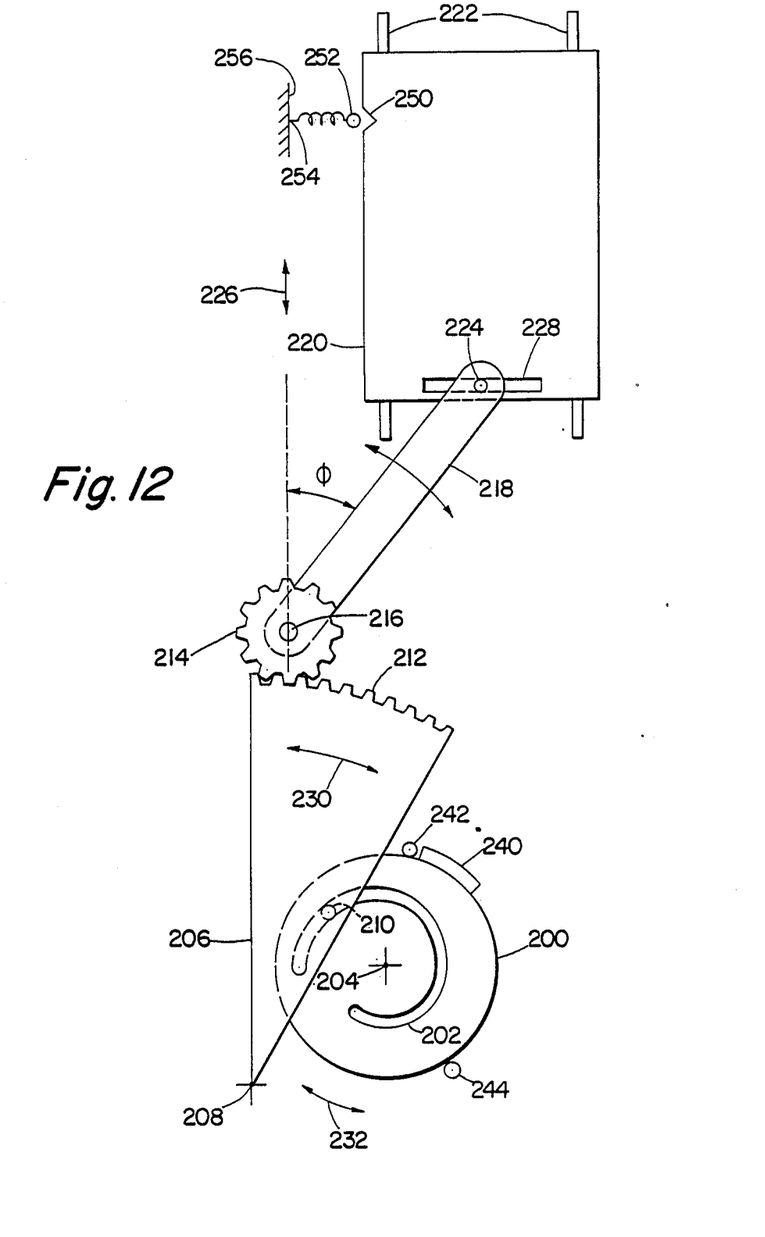
FIG. 12 is a plan view of a portion of mechanism of another embodiment of the invention.

FIG. 12 illustrates such an embodiment. In FIG. 12, a cam 200, having defined in its upper surface a cam groove 202, is pivoted about a pivot point 204 for rotative motion about the pivot 204. The rotative motion is about an axis perpendicular to the paper as shown in FIG. 12.

A gear segment arm 206 is pivotally mounted about a pivot point 208 for pivotal motion about an axis perpendicular to the plane of the paper in FIG. 12. The gear segment arm bears a cam follower 210 which is engaged to ride in the cam groove 202 of the cam 200. The outer end of the gear segment arm 206 defines a gear segment 212. A pinion gear 214 is pivotally mounted for rotation about a pivot point 216. The teeth of the pinion gear 214 engage the teeth of the gear segment 212. A drive arm 218 is mounted for rotational motion in unison with the pinion gear 214.

FIG. 12 illustrates a radiographic film cassette 220 having a generally rectangular configuration and which rides along a set of tracks 222 which define its path of motion between the park and expose positions. The drive arm 218 is pivotally mounted to the cassette at a point 224, such that, when the drive arm 218 rotates about the pivot 216 in unison with the pinion gear 214, the cassette 220 is caused to move along the tracks 222. In the direction generally indicated by the arrows 226. A slot 228 is defined in the cassette carriage in order to permit relative motion of the pivot point 224 to the right and left as shown in FIG. 12 as the drive arm 218 rotates.

Rotation of the drive arm 218 is, as mentioned above, achieved in unison with rotation of the pinion gear 214 about its pivot 216. The pinion gear is caused to be rotated by rotation of the gear segment arm 206 about its pivot 208 in the direction indicated by the arrows 230.

Rotation of the gear segment arm 206 about its pivot 208 is caused by rotation of the cam 200 about its pivot 204 in a direction indicated by the arrows 232. This rotation results because of the cooperation of the cam follower 210 riding in the cam groove 202 as the cam rotates. While the configuration of the cam groove 202 in FIG. 12 is of a general nature, and not precisely indicative of the actual shape of the cam groove, it can be seen from FIG. 12 that as the cam 200 rotates the cam follower will be moved toward or away from the cam pivot point 204, depending upon the direction of cam rotation. This radial procession of the cam follower as the cam rotates causes the motion of the gear segment arm 206 in the direction indicated by the arrows 230.

The cam is driven by a reversible electric motor, which is of known design and is not illustrated in FIG. 12.

In order to more clearly indicate the interrelation of the mechanical drive parts, FIG. 12 is not drawn to scale. The actual dimensions of the various parts and their action is set forth immediately below.

In the preferred embodiment, the distance between the pivots 216, 224 is approximately 35 millimeters. The pinion gear 214 has a diameter of approximately 44 millimeters. The gear ratio between the pinion gear 214 and the gear segment 212 is approximately 4:1. The distance between the teeth of the gear segment 212 and the pivot 208 is approximately 9.8 millimeters. The diameter of the cam 200 is approximately 22.2 millimeters. The motor causes the cam to rotate at approximately 20 revolutions per minute. In moving the cassette 220 between its park and expose positions, the angle d varies, as shown in FIG. 12 by about 90 degrees, and the cam angle rotation r by about an increment of 180°.

In the preferred embodiment, the location of the cam groove is defined by the following relations:

for $r = 170°$ to $350°$ $$y = .767 \left( \frac{r - 170}{180} \right)$$

$$\frac{\sin 2! \frac{r - 170}{180}}{2!} + 1.6730$$

For $r = 140°$ to $170°$, $y = 1.6730$ constant

For $r = 350°$ to $410°$, $y = 2.440$ constant

As can be seen from the above equations, the cam groove 202 defines a dwell time of uniform radius near each end of the cam groove.

Referring again to FIG. 12 the cam 200 defines an ear portion 240 at its outer edge. The ear portion 240, at predetermined points of cam rotation, engages respectively limit switches 242, 244. When the ear 240 engages one of the limit switches 242, 244, the motor driving the cam is deactuated. The limit switches 242, 244 are fixed at locations such that the motor is deactuated during the dwell time at either of the ends of cam motion as defined by the groove.

In the preferred embodiment, the cam groove defines a cycloidal function. It is to be understood, however, that other functions could be used as well, such as a modified sine function, or a polynomial function.

Referring again to FIG. 12, spring detent means is provided to lock the cassette affirmatively when it reaches one of the end positions of its defined movement. Only one such spring detent means is illustrated in FIG. 12, but it is to be understood that a second detent spring means could also be employed.

More specifically, the edge of the cassette carriage 220 defines a small V-groove 250, which can accommodate a detent ball 252. A spring means 254 is mounted to a fixed structure 256, and serves to resiliently bias the ball 252 toward the right as shown in FIG. 12. Thus, when the cassette reaches a point at which the V-groove 250 is aligned with the ball 252, the cassette becomes locked at that position of movement.

The spring detent means serves to minimize any back lash in cassette motion which might otherwise result from unavoidable slack in the drive mechanism as illustrated in FIG. 12.

Optionally, overload protection can be employed for the system by interposing a slip clutch, or some equivalent structure, between the motor and the cam 200.

Optionally, a known brake means could be employed to assist in mechanically or electrically braking the cassette as it nears an end of its travel path.

The design of modeled cam systems is discussed in the following publication, which is hereby expressly incorporated by reference: Tesar, D., et al., "The Dynamic Synthesis, Analysis, and Design of Modeled Cam Systems", pp. 54-69, Lexington Books, Lexington, Mass., 1976.

Cam design is also discussed in the following publication, also expressly incorporated by reference: Rothbart, H. A., "Cams", John Wiley and Sons Inc., New York, pp. 42-45.

It is to be understood that the disclosure of the embodiments of this invention set forth herein is intended as illustrative, rather than exhaustive, of the invention. It is to be recognized that those of ordinary skill in the relevant art may be able to make certain additions to, deletions from, or modifications to the embodiments set forth in this disclosure without departing from the spring or the scope of the invention, as set forth in the appended claims.

We claim:

1. A medical diagnostic spot film device comprising:
   (a) a cassette carriage for accommodating a radiographic film cassette;
   (b) structure defining a travel path of motion for said cassette carriage between a park position and an exposure position;
   (c) an x-ray source for propagating x-rays toward said expose position;
   (d) an arm pivotally mounted and coupled to said cassette carriage for driving said carriage along said travel path in response to pivotal motion of said arm;
   (e) power means including an output shaft and means for rotating said output shaft;
   (f) mechanical linkage coupling said output shaft to said arm, said linkage including cam follower means coupled to said arm and a cycloidal cam mounted for rotation in response to rotation of said output shaft, said cam being coupled between said output shaft and said cam follower means.

2. The device of claim 1, further comprising:
   limit switch means coupled to said cam for deactuating said power means in response to said cam reaching a predetermined rotational position.

3. The device of claim 1, further comprising:
   detent means for halting carriage motion at a predetermined location along said travel path.

4. The device of claim 1, wherein said mechanical linkage further comprises:
   (a) a second arm pivotally mounted and bearing a second follower, said second follower engaged with said cam;
   (b) a segment gear mounted on said second arm, and;
   (c) a pinion gear coupled to said arm and engaged with said segment gear.

* * * * *